June 19, 1951 — I. NESSON — 2,557,755
WINDSHIELD WIPER ARM
Filed Sept. 30, 1949 — 2 Sheets-Sheet 1
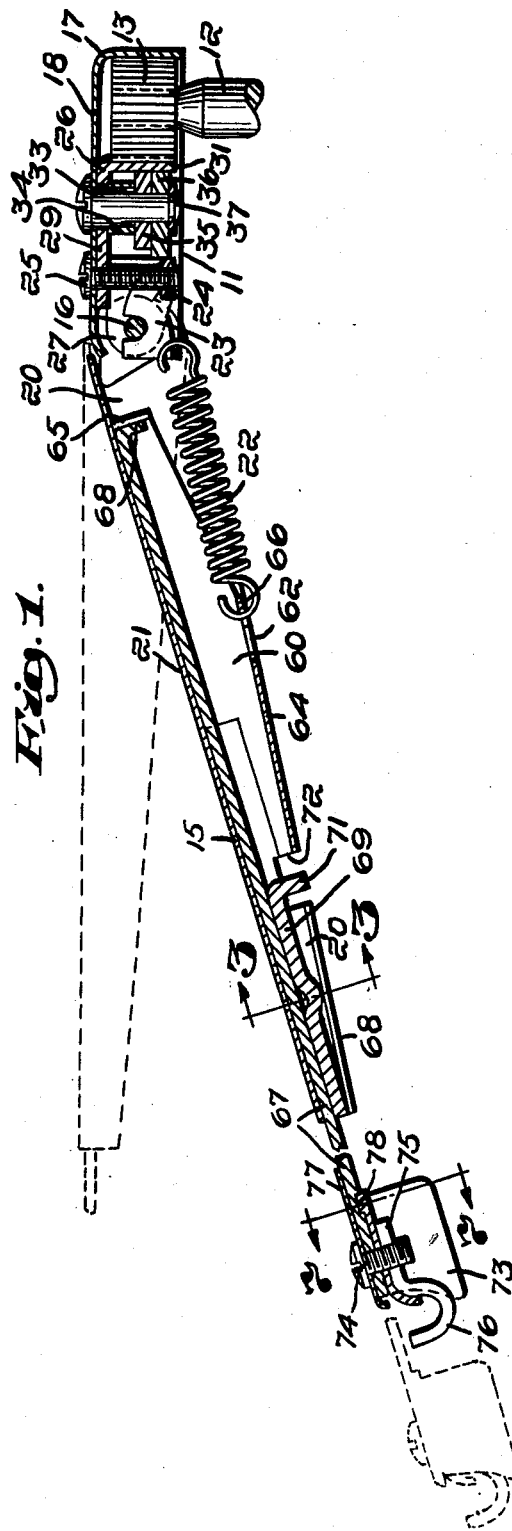
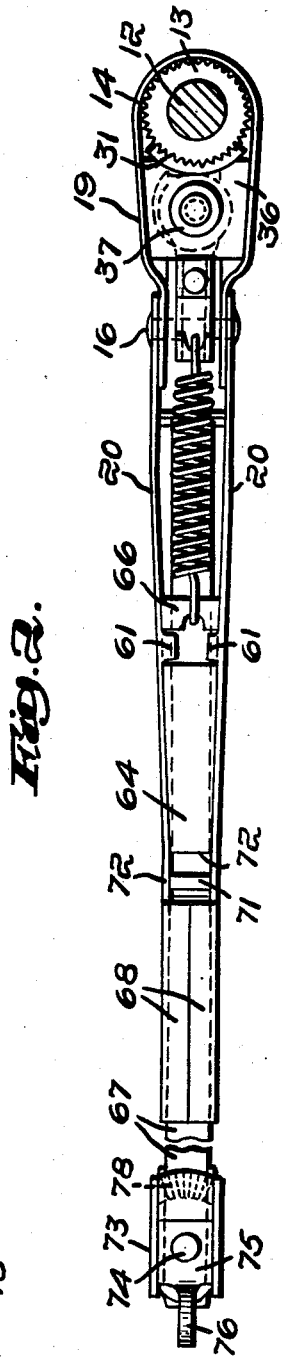
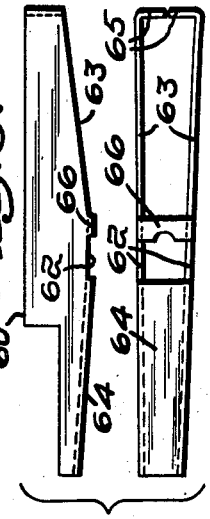
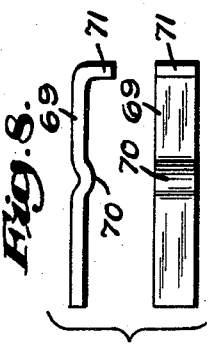
Inventor:
Israel Nesson,
by Thurson & Thurson
Attorneys

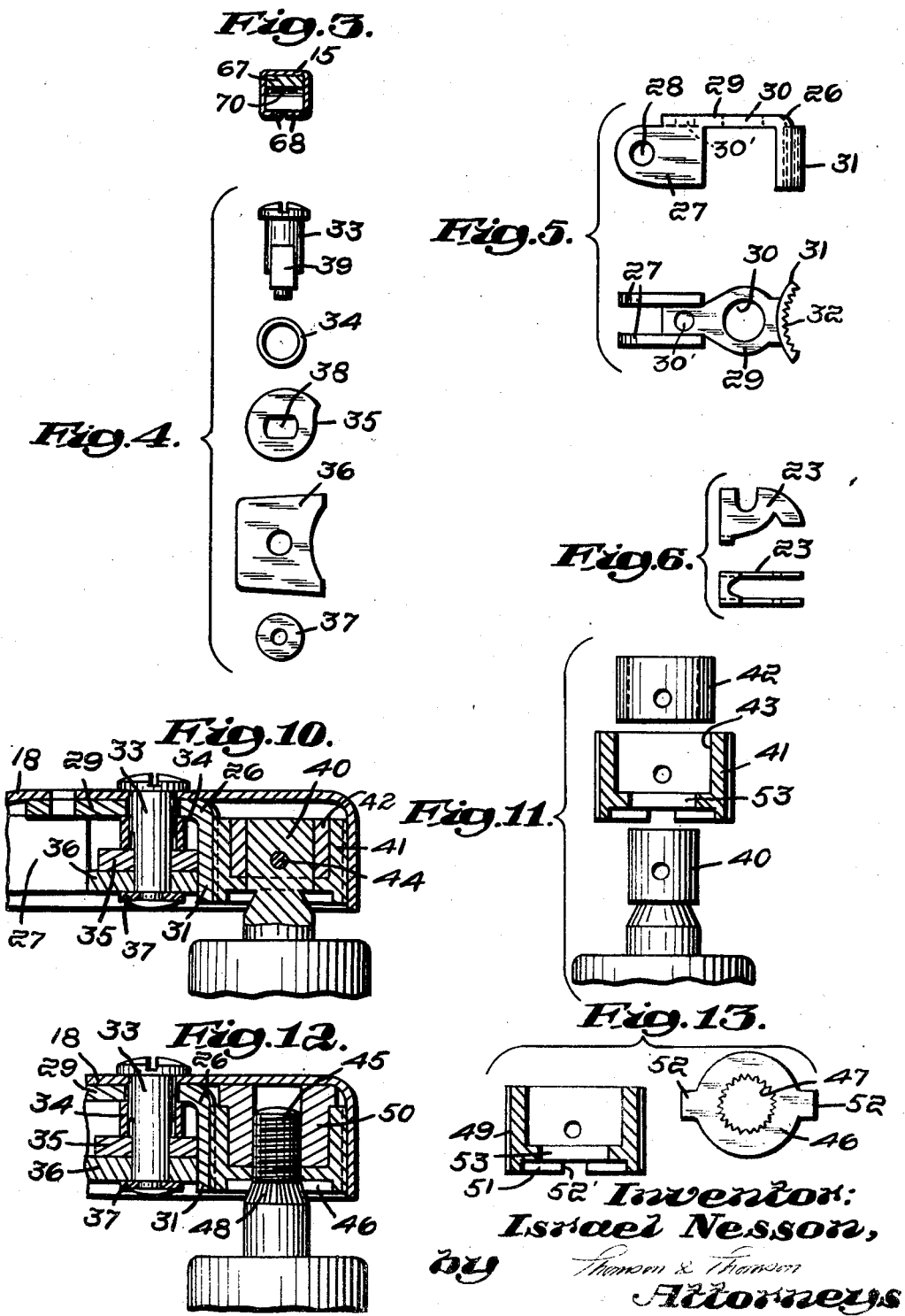

Patented June 19, 1951

2,557,755

UNITED STATES PATENT OFFICE 2,557,755

WINDSHIELD WIPER ARM

Israel Nesson, Lynn, Mass., assignor to
Max Zaiger, Swampscott, Mass.

Application September 30, 1949, Serial No. 118,808

5 Claims. (Cl. 287—52)

This invention relates to windshield wiper arms, and pertains more particularly to improvements in articulated, extensible arms of the type shown, for example, in Zaiger Patent No. 2,295,621, dated September 15, 1942.

The principal purpose of the present invention is to provide an articulated wiper arm of this type having an extensible, telescoping arm section, pivoted to a coupling section or member, the coupling section being equipped with improved means for clamping the arm as a whole to the end of the operating shaft of a conventional windshield wiper motor, the clamping device being of such a nature that the improved wiper arm may be easily and securely attached to shaft ends of at least three common types now in use. The improved wiper arm may thus be used as original equipment or as a replacement, in connection with the several types of motor shaft ends which form part of the wiper motors now commonly installed in automobiles, trucks, or other vehicles.

More particularly, it is an object of the present invention to provide a wiper arm with shaft-coupling means affording broad meeting surfaces which may be clamped together in a novel manner to ensure adequate security of the coupling, thus avoiding the use of relatively small and narrow clamping elements provided with teeth or other serrations which tend to bite into and cut the shaft end, thereby distorting the shaft and making removal and replacement of the arm difficult and unsatisfactory.

The improved coupling means is featured by the provision of a novel clamping member comprising a pair of apertured side plates adapted to be mounted within the coupling section, preferably on the transverse pivot of the articulated arm sections, a top part having a bearing against the top wall of the coupling section, and a depending, longitudinally curved clamp jaw presenting a large, serrated surface, having sufficient resilience to be moved into clamping engagement with the knurled or serrated surface of a bushing or drum secured on the end of the motor shaft, such movement being effected by a manually operated cam, the resilience of the clamp jaw ensuring that it disengages from the bushing when the cam is moved from its locking position.

Recommended embodiments of the invention are shown in the accompanying drawings but it will be understood that the structural details of the wiper arm and coupling means herein illustrated and described may be varied without departing from the essence of the present invention as set forth in the appended claims. In the drawings, Fig. 1 is a longitudinal section through an articulated, extensible wiper arm equipped with the improved telescoping and coupling sections, the movable bar of the extensible section being partly broken away, and the pivotal and extensible positions of the arm section being indicated in broken lines;

Fig. 2 is a bottom view of the wiper arm shown in Fig. 1, the coupling end of the motor shaft being shown in section;

Fig. 3 is a transverse section on line 3—3 of Fig. 1;

Fig. 4 is an exploded view of the cam member and associated elements for actuating the clamping plate;

Fig. 5 is a composite view showing the side and bottom of the clamping member;

Fig. 6 is a composite view showing the side and bottom of a rocker lever for adjusting the tension of a spring connected to said element and to a portion of the extensible arm section;

Fig. 7 is a section on line 7—7 of Fig. 1;

Fig. 8 is a composite view showing the side and bottom of a locking element for holding the telescoping members of the arm section in adjusted position;

Fig. 9 is a composite view of the side and bottom of a channel member or shield fixed in one element of the extensible arm section;

Fig. 10 is an enlarged, fragmentary, longitudinal section of the coupling member shown in Fig. 1, with certain parts omitted as applied to a pin type shaft end;

Fig. 11 is an exploded view showing attachments for the pin type shaft end, the bushing or drum element being shown in section;

Fig. 12 is a view similar to Fig. 10, showing the improved coupling applied to a screw type shaft end; and Fig. 13 is an exploded view illustrating the attachments for the screw type shaft end.

In the form shown in Figs. 1 to 9 inclusive, the improved wiper arm has a coupling section, indicated generally at 11, attached to the end 12 of a motor shaft which is conventionally equipped with a bushing or collar 13 fixed thereon and provided with a knurled or serrated surface 14; and an extensible arm section, generally indicated at 15, pivotally connected by a cross pin or rivet 16 to the coupling section 11.

The coupling section comprises a housing 17 having a flat top 18 and a depending wall 19 at the sides and one end thereof, providing a box-like cover open at its bottom and opposite end. The pivot pin 16 extends through the side walls 19 adjacent the inner end of the housing and through the sides 20 of a channel member 21 forming part of the extensible arm section 15. The articulated arm section is normally urged to the position shown in full lines in Fig. 1 by a spring 22, either a coiled type as shown, or a leaf spring, connected to a part of said arm section and to a tension lever 23 engaging the pivot 16 and also engaging the nut 24 of a tension adjustment screw 25 having its head accessible for manipulation on the housing top 18, whereby the effective tension of the spring 22 may be regulated by turning the screw 25 with a screw driver or other implement. The provision of means for adjustably tensioning the pivoted arm sections does not, however, constitute part of this invention.

In accordance with this invention, the coupling housing 18 is equipped with an adjustable clamp shown generally at 26 in Fig. 1 and comprising, as aforesaid, side members 27 provided with apertures 28 receiving the pivot 16, a top piece 29 bearing against the inner surface of the housing top 18 and having openings 30 and 30', and a resilient, depending clamp jaw 31 having a longitudinally concaved outer surface provided with longitudinal serrations 32 adapted to engage the serrations of the knurled bushing 13 on the motor shaft when said bushing is located in the outer end of the housing 17.

The clamp member 26 is held in operative position and its jaw 31 is moved toward clamping position against the bushing 13 by a rotatable stud 33 extending through an opening in the housing top 18 and through the opening 30 of the clamp member, and equipped with a spacing collar 34, a cam disc 35, a cam plate 36, and a washer 37, mounted on the stud. The cam 35 is splined to the stud by the interfitting flats of the non-circular cam opening 38 and the flats 39 of the stud 33, as shown in Fig. 4. The edge of the cam bears against the back surface of the flexible and resilient clamp jaw 31, so that rotation of the stud, as by a screw driver applied to its exposed head on the top of the housing 17, moves the jaw 31 toward clamping position against the bushing 13.

The length of the serrated surface of the jaw is substantially equal to the thickness of the bushing 13, and the jaw has substantial width, so that a large clamping surface is afforded, to securely hold the coupling section of the arm on the shaft bushing without cutting into or otherwise distorting the engaged surface of the bushing. The spacing collar 34, cam plate 35, and washer 37 serve to hold the cam 35 in proper operative position on the stud 33, so that the working edge of the cam bears substantially against the vertical center of the clamp jaw 31, which is sufficiently resilient to be moved to clamping position and to return to inoperative position when clamping pressure of the cam is released.

The coupling section 17 is thus effectively clamped to the fixed bushing 13 by slight rotation of the screw-headed stud 33, and the coupling section may be readily removed and replaced whenever desired.

The cam plate 35 additionally serves, in cooperation with the depending sides 27 of the clamp member, to support the lower end of the stud 33 and to afford a brace for the application of operating pressure by the cam 35, thereby contributing to the security of the clamping mechanism. Such support and bracing action are achieved by the engagement of an edge of the cam plate with the adjacent edges of the clamp sides 27 (Fig. 10). It is thus apparent that the clamping mechanism is operative without reference to the reception of the pivot pin 16 in the apertured sides 27, and it will be understood that the clamp member 26 need not be connected to the pivot or to any other part of the housing 18. The attachment on the pivot pin does, nevertheless, assist in retaining the clamping member in proper position within the housing during assembly of the stud 33 and its associated elements of the clamping mechanism.

The improved clamping mechanism above described may be attached to a shaft equipped with a fixed bushing 13 as above described, or to a pin type shaft or to a screw type shaft, as shown in Figs. 10 to 13. In Figs. 10 and 11, the pin type shaft end 40 is provided with an auxiliary knurled bushing or drum 41 and with a sleeve or collar 42 fitting between the shaft end 40 and an enlarged bore 43 of the drum 41. The drum and sleeve are held on the shaft end by the usual pin 44 which passes through aligned openings in the assembled parts. The clamp jaw 31 engages the serrated surface of the drum 41 in the same manner as above described.

In Figs. 12 and 13, a screw type shaft end 45 is equipped with a splined washer 46 having a serrated bore 47 engaging the serrated neck 48 of the screw type shaft, a drum or bushing 49, identical with the drum 41 of Figs. 10 and 11, and a lock nut 50 threading on the screw end 45 between said end and the wall of the bushing. The washer 46 is received in a recess 51 in the bottom of the drum 49, and the splines 52 of the washer are received in complemental notches 52' in the base of the drum. Hence, when the lock nut 50 is tightened, the drum or bushing 49 is held against rotation relative to the shaft. The clamping jaw 31 is clamped against the bushing in the manner aforesaid.

By providing a bushing such as the drum 41 or 49, applicable both to the pin type and screw type motor shaft ends, the improved coupling herein disclosed may be produced and sold for application to any of the three common types of motor shafts by furnishing with the wiper arm one auxiliary drum, a sleeve or collar and pin for use with the pin type shaft, and a splined washer and lock nut for use with the screw type shaft. If desired, the splined washer and lock nut may be furnished in two or three sizes for application to screw type shaft ends of varying diameter. It is unnecessary, however, to supply more than one auxiliary bushing for such universal application, thereby appreciably reducing the expense of auxiliary parts for that purpose, inasmuch as the bushing or drum is the only expensive part requiring accurate machinery; for the smallest portion 53 of the bore of the bushing 41 or 49 may be designed to receive any standard pin type or screw type shaft end.

The extensible section of the improved windshield wiper arm comprises the channel member 15 above mentioned, a second channel section or shaft shield 60 received between the sides 20 of member 15 and retained in the rearward portion of said member by the engagement of lugs 61 bent from the margins of said sides 20 into notches 62 in the sides 63 of the shield 60, thereby restraining the parts from relative longitudinal movement. The forward end of the member 60 is provided with an inclined bottom part 64; the rearward end of said member is provided with flanges 65 bent inwardly from the sides 63 and constituting a stop for the slidable extension bar hereinafter described; and a bridge member 66 intermediate the ends of said member provides a fixed support for the forward end of the spring 22 above described. The space between the bridge member 66 and the bottom wall 64 provides the notches or recesses 62 into which the retaining lugs 61 are bent.

The complemental sides 20 of the channel member 15 and the shaft shield 60 are preferably tapered (Fig. 2) so that the shield is inserted endwise and wedges tightly into position between the sides 20, the security of the wedged attachment being supplemented by the locking lugs 61, as above described, for securing the assembled parts against relative movement.

The channel member 15 is equipped with a slidable extension bar or shaft 67, having a downwardly bent stop 68 at its rearward or tail end which engages the stops 65 in the innermost position of the shaft, as shown in Fig. 1. The shaft shield 60 provides a bottom cover for the channel member 15 and encloses the inner portion of the slidable shaft 67.

Improved locking means are provided to secure the slidable shaft in adjusted position relative to the channel member 15. For this purpose, the forward end portion of member 15 is provided with inwardly directed bottom flanges 68, forming a bottom wall which is inclined with respect to the top wall 21 of said member against which top wall the extension bar 67 slides; and a locking piece 69 is movable between the bar 67 and said inclined bottom wall, to provide a wedge lock between said parts. The locking piece or latch 69 preferably has a transverse crimp or protuberance 70 intermediate its ends, and its rearward end is formed to provide an offset portion 71 which serves as a handle or lever for moving the latch from inoperative to operative position. The handle or lever 71 is disposed rearwardly of the rearward end of the bottom flanges 68 and forwardly of the forward end of the bottom wall 64 of the shield 60, and is accessible for movement by hand or by a suitable implement inserted at the bottom of the arm section or through slots 72 in the sides 20 of the channel member 15.

The latch 69 may thus be tightly wedged into locking position by inserting a screw driver or the like into one of the notches 72, rearwardly of the lever 71; and it may be moved to unlocking position by inserting the screw driver at the opposite side of said lever. A secure wedge lock is thus afforded for holding the sliding bar 67 in adjusted position, yet the latch may be easily and quickly released when desired. Rearward movement of the latch is limited by the engagement of the lever 71 against the aforesaid forward end of the bottom wall 64 of the shield 60, so that the shaft shield also serves as a stop for the latch 69 when moved to inoperative position.

The outer end of the extension shaft 67 is preferably provided with a channeled end piece 73, rotatably attached to the underside thereof by a lock screw 74 which passes through the top of said channel member and threads into the nut portion 75 of a hook member 76. A top plate 77 is preferably disposed between the screw head and the upper surface of the bar 76. The rearward portion 78 is preferably serrated on its upper surface to afford a firm grip against a complemental serrated portion on the undersurface of the bar 67, thereby firmly to lock the terminal 73 in adjusted angular position when the screw 74 is tightened. Other types of end pieces or terminals may be provided, however, for the blade coupling elements at the free end of shaft 67 form no part of the present invention.

I claim:

1. In a windshield wiper arm adapted to be connected to an operating shaft equipped with a bushing having a serrated peripheral surface, a coupling section comprising a housing having top and side walls and a curved end wall providing a chamber for receiving the shaft bushing and associated clamping mechanism, a clamp member disposed in said chamber and having a top portion, a resilient depending clamp jaw at one end thereof and a depending brace at the opposite end thereof, said jaw having a concaved serrated front surface complemental to and engageable with the serrated surface of said bushing, a manually rotatable stud extending downwardly through said top wall and said top portion, means on the lower portion of said stud and engaging said depending brace, and a cam disc splined to said stud intermediate said means and said top portion and engageable with the back of said jaw, whereby manual rotation of the stud moves the cam disc to flex said jaw into locking engagement with said bushing.

2. In a windshield wiper arm adapted to be connected to an operating shaft equipped with a bushing having a serrated peripheral surface, a coupling section comprising a housing having top and side walls and a curved end wall providing a chamber for receiving the shaft bushing and associated clamping mechanism, a clamp member disposed in said chamber and having a top portion engageable with the top wall of the housing, a resilient depending clamp jaw at one end thereof and a depending brace at the opposite end thereof, said jaw having a concaved serrated front surface complemental to and engageable with the serrated surface of said bushing, a manually rotatable stud extending downwardly through said top wall and said top portion, a plate mounted on the lower portion of said stud and having an edge engaging said depending brace, and a cam disc splined to said stud intermediate said plate and said top portion and engageable with the back of said jaw, whereby manual rotation of the stud moves the cam disc to flex said jaw into locking engagement with said bushing.

3. In a windshield wiper arm adapted to be connected to an operating shaft equipped with a bushing having a serrated peripheral surface, a coupling section comprising a housing having top and side walls and a curved end wall providing a chamber for receiving the shaft bushing and associated clamping mechanism with the bushing disposed adjacent said curved end wall, a clamp member disposed in said chamber and having a top portion engageable with the top wall of the housing, a resilient depending clamp jaw at one end thereof, and depending side braces at the opposite end thereof, said jaw having a serrated front surface complemental to and engageable with the serrated surface of said bushing, a manually rotatable stud extending downwardly through said top wall and said top portion, a plate mounted on the lower portion of said stud and having edges engaging said depending side braces, and a cam disc splined to said stud intermediate said plate and said top portion and engageable with the back of said jaw, whereby manual rotation of the stud moves the cam disc to flex said jaw into locking engagement with said bushing.

4. In a windshield wiper arm adapted to be connected to an operating shaft equipped with a bushing having a serrated peripheral surface, a coupling section comprising a housing having top and side walls and a curved end wall providing a chamber for receiving the shaft bushing and associated clamping mechanism, a clamp member disposed in said chamber and having a top portion engageable with the top wall of the housing, a depending clamp jaw at one end thereof and a depending brace at the opposite end thereof, said jaw having a serrated front surface complemental to and engageable with the serrated surface of said bushing, a manually rotatable stud extending downwardly through said top wall and said top portion, a plate mounted on the lower portion of said stud and having an edge engaging said depending brace, a cam disc splined to said stud above said plate and engageable with the back of said jaw, a collar disposed on said stud intermediate said cam disc and said top portion, whereby manual rotation of the stud moves the cam disc to flex said jaw into locking engagement with said bushing.

5. In a windshield wiper arm adapted to be connected to an operating shaft equipped with a bushing having a serrated peripheral surface, a coupling section comprising a housing having top and side walls and a curved end wall providing a chamber for receiving the shaft bushing and associated clamping mechanism with the bushing disposed adjacent said curved end wall, a clamp member disposed in said chamber and having a top portion engageable with the top wall of the housing, a resilient depending clamp jaw at one end thereof and depending side braces at the opposite end thereof, said jaw having a concaved serrated front surface complemental to and engageable with the serrated surface of said bushing, a manually rotatable stud extending downwardly through said top wall and said top portion, a plate mounted on the lower portion of said stud and having edges engaging said depending side braces, a cam disc splined to said stud above said plate and engageable with the back of said jaw, a collar disposed on said stud intermediate said cam disc and said top portion, whereby manual rotation of the stud moves the cam disc to flex said jaw into locking engagement with said bushing, and means on the lower end of said stud for retaining said collar, cam disc and plate in juxtaposed relation on said stud.

ISRAEL NESSON.

No references cited.